(12) United States Patent
Wang et al.

(10) Patent No.: US 10,333,687 B2
(45) Date of Patent: Jun. 25, 2019

(54) METHOD AND APPARATUS FOR IMPLEMENTING INTERFERENCE ALIGNMENT ON THE BASIS OF CODEBOOK DESIGN AND SELECTION

(71) Applicant: ZTE CORPORATION, Shenzhen, Guangdong Province (CN)

(72) Inventors: Chaowei Wang, Shenzhen (CN); Chen Huang, Shenzhen (CN); Cheng Wang, Shenzhen (CN); Nan Li, Shenzhen (CN); Mingxia Cao, Shenzhen (CN); Tian Cai, Shenzhen (CN); Yihuai Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 198 days.

(21) Appl. No.: 15/319,805

(22) PCT Filed: Oct. 20, 2014

(86) PCT No.: PCT/CN2014/088983
§ 371 (c)(1),
(2) Date: Feb. 10, 2017

(87) PCT Pub. No.: WO2015/192564
PCT Pub. Date: Dec. 23, 2015

(65) Prior Publication Data
US 2017/0149549 A1 May 25, 2017

(30) Foreign Application Priority Data
Jun. 20, 2014 (CN) .......................... 2014 1 0280934

(51) Int. Cl.
*H04L 5/14* (2006.01)
*H04B 7/06* (2006.01)
(Continued)

(52) U.S. Cl.
CPC ............. *H04L 5/14* (2013.01); *H04B 7/0452* (2013.01); *H04B 7/0456* (2013.01); *H04B 7/0626* (2013.01); *H04L 25/03* (2013.01)

(58) Field of Classification Search
CPC ......... H04L 5/14; H04L 25/03; H04B 7/0626; H04B 7/0452; H04B 7/0456
See application file for complete search history.

(56) References Cited

U.S. PATENT DOCUMENTS

| | | | |
|---|---|---|---|
| 2013/0170533 A1* | 7/2013 | Khojastepour | ...... H04B 7/0456 375/227 |
| 2015/0358057 A1* | 12/2015 | Lindqvist | ............... H04B 7/024 370/329 |
| 2016/0337008 A1* | 11/2016 | Li | ......................... H04B 7/024 |

FOREIGN PATENT DOCUMENTS

| | | |
|---|---|---|
| CN | 103023838 A | 4/2013 |
| CN | 103825674 A | 5/2014 |
| WO | WO2012104675 A1 | 8/2012 |

OTHER PUBLICATIONS

Paul Ferrand, Jean-Marie Gorce. Downlink Cellular Interference Alignment. [Research Report] RR-8543, INRIA. 2014. <hal-00996728> (Year: 2014).*

(Continued)

*Primary Examiner* — Omar J Ghowrwal
(74) *Attorney, Agent, or Firm* — Ling Wu; Stephen Yang; Ling and Yang Intellectual Property

(57) ABSTRACT

Disclosed are a method and apparatus for interference alignment based on codebook design and selection. The method includes: a codebook set including codebooks of different sizes of a precoding matrix is pre-designed or pre-stored; a receiver or a transmitter selects a codebook satisfying a specified condition from the codebook set to explicitly or implicitly notify the opposite end; the receiver designs, based on obtained ideal CSI and an interference (Continued)

alignment condition, a precoding matrix V and a receiving matrix U for interference alignment; the receiver selects a matrix V' having the highest similarity to V from the current codebook to serve as a finally quantized precoding matrix V'; the receiver calculates, based on V', U again to obtain a receiving matrix U' according to the interference alignment condition; and the transmitter transmits a signal according to feedback information and V', and the receiver filters the signal according to U'.

18 Claims, 5 Drawing Sheets

(51) Int. Cl.
*H04B 7/0452* (2017.01)
*H04B 7/0456* (2017.01)
*H04L 25/03* (2006.01)

(56) References Cited

OTHER PUBLICATIONS

H. Lee, K. Park, Y. Ko and M. Alouini, "Codebook-based interference alignment for uplink MIMO interference channels," in Journal of Communications and Networks, vol. 16, No. 1, pp. 18-25, Feb. 2014.doi: 10.1109/JCN.2014.000005 (Year: 2014).*
Hyun-Ho Lee et al., Codebook-Based Interference Alignment for Uplink MIMO Interference Channels, Journal of Communications and Networks, vol. 16, Feb. 2014, XP011542608.
Ratheesh K. Mungara et al., Pilot-Assisted Interference Alignment in Time-Selective Fading Channels, Wireless Communications Symposium, Globecom 2013, XP032604952.
Zhinan Xu et al., Time-Variant Channel Prediction for Interference Alignment with Limited Feedback, W3: Workshop on Small Cell and 5G Networks, ICC'14, XP032630820.

* cited by examiner

METHOD AND APPARATUS FOR IMPLEMENTING INTERFERENCE ALIGNMENT ON THE BASIS OF CODEBOOK DESIGN AND SELECTION

TECHNICAL FIELD

The present document relates to the field of communications, and more particularly to a method and apparatus for implementing interference alignment based on codebook design and selection.

BACKGROUND

Compared with a 3G technology, a Long Term Evolution (LTE) system receives much concern and is highly praised due to the characteristics of high data rate, flexible spectrum configuration mode and packet transport mode, low delay, wide coverage domain, high downward compatibility and the like. The LTE system simultaneously defines two different duplexing modes, namely Frequency Division Duplexing (FDD) and Time Division Duplexing (FDD). Here FDD performs transmitting and receiving over two separated symmetric frequency channels, and separates transmitting and receiving channels by a protective frequency band, so FDD must distinguish uplinks and downlinks by means of paired frequencies, resources in a single direction thereof are successive temporally. When supporting symmetric services, FDD can fully utilize uplink and downlink spectra. However, when supporting asymmetric services, the spectrum efficiency will be greatly reduced. In a conventional cell wireless communication system, downlink channel of a typical FDD mode system is usually allocated to a higher frequency band. This is because the higher the frequency band corresponding to a signal is, the greater the energy loss caused by path loss is. In a downlink direction, a Base Station (BS) may compensate the path loss by using higher transmitting power, while for an uplink direction, a mobile station end will reduce the transmitting power to the greatest extent due to limitations of device size and design cost, therefore, a downlink channel is usually allocated to the higher frequency band in an FDD system.

Because an original dedicated radio system occupies conventional frequency resources, different operator networks are improperly configured and there exists the problems of transmitter setting, geographical location overlapping, Electro Magnetic Compatibility (EMC) and intentional interference, a wireless communication system has various interferences such as same frequency interference, adjacent channel interference, out-of-band interference, inter-modulation interference and blocking interference, etc. The leading interference therein is the interference caused by resource reuse. In an actual wireless communication system, usually a plurality of users shares some communication resources, so when a plurality of channels transmit data by using an identical resource such as a frequency subcarrier and a time slot, the channels will interfere with each other. Particularly, as for downlink transmission of a multi-cell and multi-user Multiple-Input Multiple-Output (MIMO) system, when a certain BS (transmitter) sends information to a user (receiver) in a cell where the BS is located, because a frequency reuse factor of the system is 1, the BS will interfere with users in other cells, this interference being Inter-Cell Interference (ICI). Because the BS serves a plurality of users by using the same frequency resource at the same time, Inter-User Interference (IUI) may exist between the users in the cells. Due to the coexistence of ICI and IUI, the system performance will be seriously limited by the interference. Therefore, an effective interference suppression technology is an objective of a prolonged endeavor of each research institute. An interference alignment technology is an emerging novel interference suppression mode with great potential in recent years, which may greatly improve the system capacity. The interference alignment technology evaluates the system capacity by using the Degree of Freedom (DoF) (also called as multiplexing gain), the accuracy of evaluation is improved along with increase of a Signal to Noise Ratio (SNR). Obviously, the emergence of the interference alignment technology creates a new direction for interference suppression, and the interference alignment technology also attracts wide attention from various academic institute and research institute at home and abroad.

The basic idea of interference alignment is to co-design a precoding matrix and a receiving matrix between each transmitter and receiver, to limit an interference signal within a subspace of a receiving signal space, and to reserve another interference-free signal subspace for data transmission. The implementation premise of the interference alignment technology is that the transmitter and the receiver need to obtain global Channel State Information (CSI). In an actual communication system, a TDD system may obtain ideal Channel State Information at Transmitter (CSIT) by using channel reciprocity. However, an FDD system does not have the channel reciprocity, and CSIT cannot be obtained directly by channel estimation. Usually, as for the FDD system, the receiver performs channel estimation, and then feeds back the obtained CSI to the transmitter via a feedback channel. This feedback mode may form non-ideal CSIT due to the following factors:

channel estimation error: a CSI estimation algorithm cannot completely obtain ideal information of a current channel, a certain error exists inevitably, and the CSIT is non-ideal after feeding back to the transmitter;

channel delay: channel measurement is performed at the receiver, it will take some time to feed back a measurement result to the transmitter, and in a time-varying channel, when feedback information is transmitted to the transmitter, a channel state has been changed, thus causing that the Channel State Information obtained at the transmitter is delayed; and limited feedback channel capacity: the limitation of a feedback channel capacity affects the accuracy of the CSIT, and at this moment, the transmitter may only obtain part of the CSIT.

Therefore, in an actual communication scenario, due to the existence of the problems of time-varying characteristics of a channel, capacity limitation of a feedback channel, feedback delay and the like, the CSIT is non-ideal. The performance obtained based on interference alignment of the non-ideal CSIT will also decrease inevitably. Therefore, it is very important to study the influence on the interference alignment caused by the non-ideal CSIT to propose a new interference alignment improvement solution, and reduce the influence on the system performance caused by the non-determinacy of the CSI.

From the perspective of information theory, a Dirty Paper Coding (DPC) theory proves that in an interfered system, if the transmitter can accurately learn of an interference signal, the channel capacity of an interfered system may be identical to that of an interference-free system by means of certain precoding processing at the transmitter. Because the DPC theory is difficult to be applied to an actual system, some suboptimal precoding technologies emerge. One class is a precoding technology based on real-time channel processing such as channel inversion, channel Block Diagonalization (BD), etc., where it is necessary for the transmitter to learn of all or part of CSI, and at this moment, the feedback quantity of channel information is larger, which is not in favor of practical application. The other class is a codebook-based precoding technology. The codebook-based precoding technology pre-learns of fixed codebooks at both the transmitter and the receiver, the system selects an appropriate precoding vector from the fixed codebooks to precode a transmitting user according to Channel Quality Information (CQI) which is fed back, and the feedback quantity may be reduced by codebook selection due to limited channel capacity. Therefore, a codebook selection-based precoding solution has a higher practical value due to small feedback quantity.

An effective solution has not been proposed yet at present for the problem in the existing technology that ideal Channel State Information can not be obtained at the transmitter in an LTE-FDD system.

SUMMARY

The embodiments of the present document provide a method and apparatus for implementing interference alignment based on codebook design and selection, which may be used for solving the abovementioned technical problem that an LTE-FDD system cannot obtain ideal CSIT in the existing art.

According to one aspect of the present document, an embodiment of the present document provides a method for implementing, by a receiver, interference alignment based on codebook design and selection, the method including the following steps:

pre-designing or pre-storing a codebook set of a precoding matrix; herein the codebook set includes codebooks of different sizes;

selecting a codebook satisfying a specified condition from the codebook set to serve as a current codebook, and explicitly or implicitly notifying a transmitter, or receiving an explicit or implicit notification of the current codebook from the transmitter;

designing, based on obtained ideal CSI and an interference alignment condition, a precoding matrix V and a receiving matrix U arranged to implement interference alignment; selecting a matrix V' having a highest similarity to the precoding matrix V from the current codebook to serve as a finally quantized precoding matrix V'; and calculating, based on the quantized precoding matrix V', the receiving matrix U again to obtain a receiving matrix U' according to the interference alignment condition;

notifying the transmitter of an index number of the quantized precoding matrix V'; and filtering a signal according to the receiving matrix U' to implement interference alignment.

In an exemplary embodiment, pre-designing or pre-storing a codebook set of a precoding matrix includes: designing, according to a transmitting antenna number configuration of a multi-cell multi-antenna system and a number of data streams to be sent by a user in the system, a codebook set of codebooks of different sizes and storing the codebook set, or pre-storing a codebook set.

In an exemplary embodiment, selecting a codebook satisfying a specified condition from the codebook set to serve as a current codebook includes: selecting, according to a feedback capacity limitation of the current system and a quantization error range allowed by the system, a codebook from the codebook set to serve as the current codebook.

In an exemplary embodiment, after the matrix V' having the highest similarity to the precoding matrix V is selected from the current codebook to serve as the finally quantized precoding matrix V', the method further includes: feeding back or indicating the index number of the quantized precoding matrix V' to the transmitter.

According to one aspect of the present document, another embodiment of the present document provides a method for implementing, by a transmitter, interference alignment based on codebook design and selection, herein the method includes the following steps:

pre-designing or pre-storing a codebook set of a precoding matrix; herein the codebook set includes codebooks of different sizes;

selecting a codebook satisfying a specified condition from the codebook set to serve as a current codebook, and explicitly or implicitly notifying a receiver, or receiving an explicit or implicit notification of the current codebook from the receiver; and receiving an index number of a quantized precoding matrix V' sent by the receiver, and transmitting a signal by using the quantized precoding matrix V' according to the index number, herein the quantized precoding matrix V' is determined by the receiver via the following way:

designing, based on obtained ideal CSI and an interference alignment condition, a precoding matrix V arranged to implement interference alignment; and selecting a matrix V' having a highest similarity to the precoding matrix V from the current codebook to serve as the finally quantized precoding matrix V'.

In an exemplary embodiment, pre-designing or pre-storing a codebook set of a precoding matrix includes: designing, according to a transmitting antenna number configuration of a multi-cell multi-antenna system and a number of data streams to be sent by a user in the system, a codebook set of codebooks of different sizes, and storing the codebook set; or pre-storing a codebook set.

In an exemplary embodiment, selecting a codebook satisfying a specified condition from the codebook set to serve as a current codebook includes: selecting, according to a feedback capacity limitation of the current system and a quantization error range allowed by the system, a codebook from the codebook set to serve as the current codebook.

In an exemplary embodiment, receiving an index number of a quantized precoding matrix V' sent by the receiver includes: receiving feedback information or indication information sent by the receiver.

According to another aspect of the present document, an embodiment of the present document provides an apparatus for implementing, by a receiver, interference alignment based on codebook design and selection, which includes:

a first set storage module, arranged to store, pre-design a codebook set of a precoding matrix; herein the codebook set includes codebooks of different sizes;

a first codebook selection module, arranged to select a codebook satisfying a specified condition from the codebook set to serve as a current codebook, and explicitly or implicitly notify the transmitter;

a first codebook information transmitting and receiving module, arranged to explicitly or implicitly notify the transmitter of the current codebook, or receive an explicit or implicit notification of the current codebook from the transmitter;

a matrix designing module, arranged to design, based on obtained ideal CSI and an interference alignment condition, a precoding matrix V and a receiving matrix U arranged to implement interference alignment;

a matrix processing module, arranged to select a matrix V' having a highest similarity to the precoding matrix V from the current codebook to serve as a finally quantized precoding matrix V', and calculate, based on the quantized precoding matrix V', the receiving matrix U again to obtain a receiving matrix U' according to the interference alignment condition;

a signal filtering module, arranged to filter a signal according to the receiving matrix U' to implement interference alignment; and a precoding matrix index notification module, arranged to notify the transmitter of an index number of the quantized precoding matrix V'.

In an exemplary embodiment, the first set storage module includes: a first design unit, arranged to design, according to a transmitting antenna number configuration of a multi-cell multi-antenna system and a number of data streams to be sent by a user in the system, a codebook set of codebooks of different sizes; and a first storage unit, arranged to store the codebook set.

In an exemplary embodiment, the first codebook selection module includes: a codebook selection unit, arranged to select, according to a feedback capacity limitation of the current system and a quantization error range allowed by the system, a codebook from the codebook set to serve as the current codebook.

In an exemplary embodiment, the precoding matrix index notification module is arranged to feed back or indicate the index number of the quantized precoding matrix V' to the transmitter.

According to another aspect of the present document, another embodiment of the present document provides an apparatus for implementing, by a transmitter, interference alignment based on codebook design and selection, which includes:

a second set storage module, arranged to pre-design a codebook set of a precoding matrix; herein the codebook set includes codebooks of different sizes;

a second codebook selection module, arranged to select a codebook satisfying a specified condition from the codebook set to serve as a current codebook, and explicitly or implicitly notify a receiver;

a second codebook information transmitting and receiving module, arranged to explicitly or implicitly notify the receiver of the current codebook, or receive an explicit or implicit notification of the current codebook from the receiver;

a precoding matrix index receiving module, arranged to receive index number information of a quantized precoding matrix V' sent by the receiver; and a signal transmitting module, arranged to transmit a signal by using the quantized precoding matrix V' according to the index number feedback information received by the precoding matrix receiving module to implement interference alignment, herein the quantized precoding matrix V' is determined by the receiver via the following way:

designing, based on obtained ideal CSI and an interference alignment condition, a precoding matrix V for implementing interference alignment; and selecting a matrix V' having a highest similarity to the precoding matrix V from the current codebook to serve as the finally quantized precoding matrix V'.

In an exemplary embodiment, the second set storage module includes: a second design unit, arranged to design, according to a transmitting antenna number configuration of a multi-cell multi-antenna system and a number of data streams to be sent by a user in the system, a codebook set of codebooks of different sizes; and a second storage unit, arranged to store the codebook set.

In an exemplary embodiment, the second codebook selection module includes: a codebook selection unit, arranged to select, according to a feedback capacity limitation of the current system and a quantization error range allowed by the system, a codebook from the codebook set to serve as the current codebook.

In an exemplary embodiment, the precoding matrix index receiving module is arranged to receive feedback information or indication information of the index number of the quantized precoding matrix V' sent by the receiver.

According to another aspect of the present document, an embodiment of the present document provides a computer program and a carrier thereof, the computer program includes program instructions. When the program instructions are executed by a receiver device, the receiver device may be enabled to carry out the abovementioned method for implementing, by a receiver, interference alignment based on codebook design and selection.

According to another aspect of the present document, another embodiment of the present document provides a computer program and a carrier thereof, the computer program includes program instructions. When the program instructions are executed by a transmitter device, the transmitter device may be enabled to carry out the method for implementing, by a transmitter, interference alignment based on codebook design and selection.

The embodiments of the present document relate to an interference alignment technology for downlink transmission in an LTE-FDD multi-cell system and a codebook design and selection technology satisfying an interference alignment condition, and provides a method and apparatus for implementing interference alignment by designing a precoding matrix and a receiving matrix at a receiver and feeding back the precoding matrix. The embodiment of the present document solves the problem in the existing technology that an LTE-FDD system cannot obtain ideal CSIT, not only can obtain the precoding matrix and the receiving matrix matched with the interference alignment condition and avoid influence on an interference alignment performance caused by non-ideal CSI, but also can reduce the feedback quantity and satisfy a feedback capacity limitation condition while ensuring the interference alignment performance, thus effectively implementing interference alignment.

The abovementioned description is merely a summary of the technical solutions of the embodiment of the present document. In order to be capable of more clearly understanding the technical means of the present document, the technical solution may be carried out in accordance with the content of the specification. Moreover, in order to make the abovementioned description and other purposes, features and advantages of the present document more understandable, specific embodiments of the present document will be illustrated.

PREFERRED EMBODIMENTS

In order to solve the problem in the related art that ideal CSIT cannot be obtained in an LTE-FDD system, the embodiments of the present document provide a method and apparatus for implementing interference alignment based on codebook design and selection. The embodiments of the present document will be elaborated below in combination with accompanying drawings. It shall be illustrated that embodiments in the present application and features in the embodiments may be randomly combined with each other in case of no conflicts. It will be understood that specific embodiments described herein are only intended to explain the present document and do not limit the present document.

A flow for implementing interference alignment provided by an embodiment of the present document refers to that:

firstly, a codebook set of a precoding matrix is pre-designed or pre-stored at a transceiver, the codebook set includes codebooks of different sizes, and the codebooks are only related to the number of transceiver antennae and the number of data streams and will not change along with the change of a channel state;

a receiver or a transmitter selects an appropriate codebook from the designed codebook set according to the size of a system feedback capacity and the number of data streams to be sent by a user, and explicitly or implicitly notifies the opposite end;

then, the receiver designs, based on the obtained ideal CSI, a precoding matrix V and a receiving matrix U for implementing interference alignment;

a matrix V' having the highest similarity to the ideal precoding matrix V is selected from the codebook to serve as a finally precoding matrix, each receiver feeds back a serial number of the selected codebook and a serial number of the precoding matrix to the respective transmitter, and the transmitter selects a corresponding matrix to transmit a signal according to the serial number; and the receiver calculates, based on the quantized matrix V', the receiving matrix again to obtain U' according to an interference alignment condition, to eliminate the interference to the greatest extent.

Based on analysis on the abovementioned problems, the embodiment of the present document eliminates ICI by using an interference alignment technology. For the problem that ideal CSIT cannot be obtained in an LTE-FDD system, a precoding matrix and a receiving matrix are designed at a receiver based on ideal CSI, and the precoding matrix is fed back to a transmitter based on a codebook, thus reducing the feedback quantity and the implementation complexity in interference alignment while ensuring that the precoding matrix and the receiving matrix are matched with an interference alignment condition. By this solution, the problems caused by inability to obtain the ideal CSIT during application of an interference alignment technology to downlink transmission of a multi-cell MIMO system are solved. Introductions will be made below by a specific embodiment.

Figure 1:
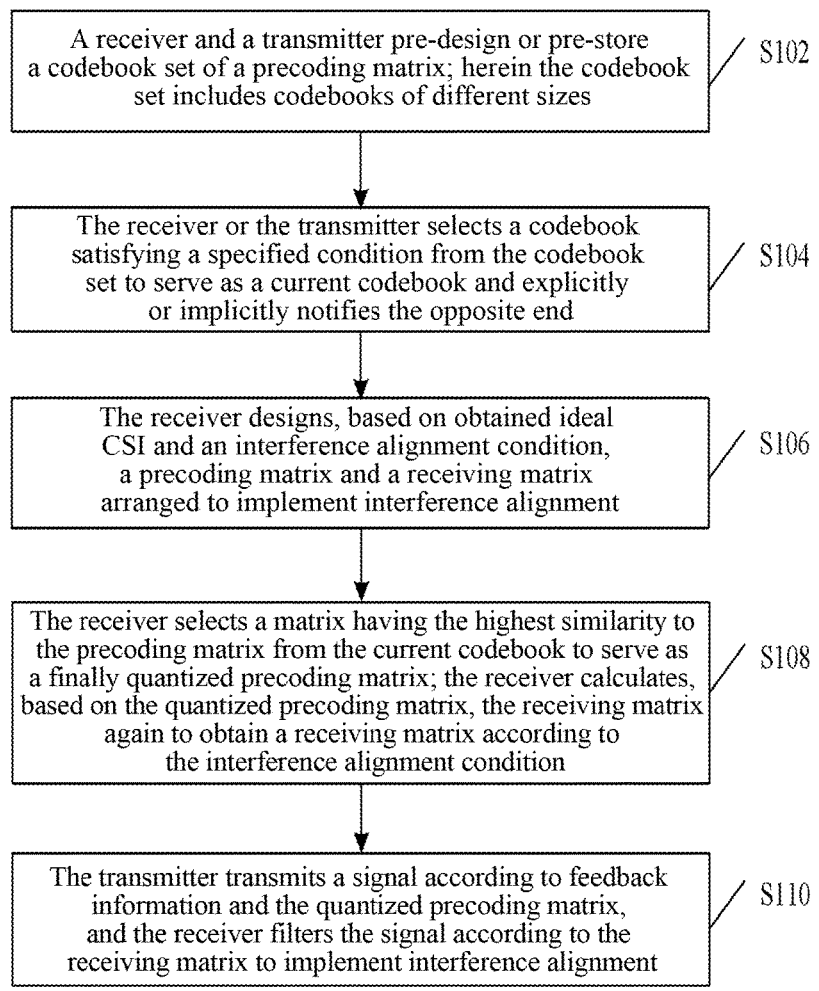
FIG. 1 is a flowchart of a method for implementing interference alignment based on codebook design and selection according to an embodiment of the present document.

The present embodiment provides a method for implementing interference alignment based on codebook design and selection. FIG. 1 is a flowchart of a method for implementing interference alignment based on codebook design and selection according to an embodiment of the present document. As shown in FIG. 1, the method includes the following steps (Step S102 to Step S110).

In Step S102, A codebook set of a precoding matrix is pre-designed or pre-stored; herein the codebook set includes codebooks of different sizes.

Specifically, a codebook set of codebooks of different sizes is designed according to the transmitting antenna number configuration of a multi-cell multi-antenna system and the number of data streams to be sent by a user in this system; a receiver and a transmitter store the codebook set respectively.

In Step S104, The receiver or the transmitter selects a codebook satisfying a specified condition from the codebook set to serve as a current codebook, and explicitly or implicitly notifies the opposite end.

Specifically, the receiver selects a codebook from the codebook set to serve as a current codebook according to a feedback capacity limitation of the current system and the number of the data streams to be sent by the user, and explicitly or implicitly notifies the transmitter. Or, the transmitter selects a codebook from the codebook set to serve as a current codebook according to the feedback capacity limitation of the current system and the number of the data streams to be sent by the user, and explicitly or implicitly notifies the receiver.

In Step S106, The receiver designs, based on obtained ideal CSI and an interference alignment condition, a precoding matrix V and a receiving matrix U arranged to implement interference alignment.

In Step S108, The receiver selects a matrix V' having the highest similarity to the precoding matrix V from the current codebook to serve as a finally quantized precoding matrix V'; and the receiver calculates, based on the quantized precoding matrix V', the receiving matrix U again to obtain a receiving matrix U' according to the interference alignment condition.

Thereafter, alternatively, the receiver feeds back an index number of the quantized precoding matrix V' and an index number of the current codebook to the transmitter. Or, the receiver indicates the index number of the quantized precoding matrix V' and the index number of the current codebook to the transmitter.

In Step S110, The transmitter is arranged to transmit a signal according to feedback information and the quantized precoding matrix V', and the receiver filters the signal according to the receiving matrix U' to implement interference alignment.

This embodiment provides a model for implementing interference alignment based on codebook design and selection, applied to an LTE-FDD system. The codebook set of codebooks of different sizes is designed according to the characteristics of the precoding matrix for interference alignment, the number of the transmitting antennae and the number of the data streams of the user, and the transmitter and the receiver store the codebook set. The receiver or the transmitter selects the appropriate codebook from the codebook set according to the feedback capacity limitation of the current system and the number of the data streams to be sent by the user, and explicitly or implicitly notifies the opposite end. The receiver designs the precoding matrix and the receiving matrix for interference alignment according to ideal CSI, quantizes the precoding matrix as a matrix in this codebook, and feeds back the index numbers of the codebook and matrix to the transmitter. The receiving matrix is calculated again according to the interference alignment condition and the quantized precoding matrix, such that a processed interference signal is zero, and the dimensionality of a desired signal satisfies transmission of the data streams.

In the present embodiment, the precoding matrix and the receiving matrix are well matched, and ideally satisfy the interference alignment condition. In addition, suppose CSI at the receiver is ideal, interference alignment design is performed at the receiver based on this information, such that the influence on interference alignment caused by the non-ideal CSI due to feedback may be avoided. Moreover, the precoding matrix is fed back to the transmitter based on the codebook, thus reducing the feedback quantity.

In the present embodiment, the size of the codebook is related to a feedback capacity limitation and a quantization error range allowed by the system, and it is necessary to consider the number of the transmitting antennae and the number of the data streams of the user when the codebook is designed according to the idea of Grassmann codebook.

In the above Step S104, the codebook suitable for communications of the current system is adaptively selected from the codebook set. Influencing factors of the size of the codebook include the feedback capacity of the system and the number of data streams to be sent by a User Equipment (UE). On one hand, the channel capacity for information feedback is limited, the more the matrices in the codebook are, the greater the number of bits needed by indexing each matrix is, and the greater the quantity of feedback information is, therefore, in order to reduce the feedback quantity, the size of the codebook cannot be too large, and the complexity in codebook search will be increased due to over-large codebook. On the other hand, in order to find a matrix having the highest similarity to an ideal precoding matrix from the codebook and to reduce the quantization error of the precoding matrix, more matrices in the codebook are preferred, that is, a larger codebook is preferred. The receiver adaptively selects the appropriate codebook from the codebook set to serve as the current codebook according to requirements of the current system and a certain criterion.

In the above Step S106, the precoding matrix V and the receiving matrix U satisfying the interference alignment condition are designed to make V and U satisfy:

$$U_k^H H_{kl} V_l = 0, \forall k \neq l$$

$$\text{rank}(U_k^H H_{kk} V_k) = d_s, \forall k \in (1,2 \ldots K) \quad (1)$$

herein $H_{kl}$ is a channel matrix from a transmitter l to a receiver k, $V_l$ and $U_k$ are a precoding matrix of the transmitter l and a receiving matrix of the receiver k respectively, and $d_s$ is the number of data streams to be sent to each user. The design of $U_k$ shall satisfy that interference alignment of the transmitter l to all non-serving receivers is within a space $T_l$. That is, $$\text{span}(U_2^H H_{21}, U_3^H H_{31}, \ldots, U_K^H H_{K1}) = T_1 \quad (2)$$

$$\text{span}(U_1^H H_{12}, U_3^H H_{32}, \ldots, U_K^H H_{K2}) = T_2$$

$$\vdots$$

$$\text{span}(U_1^H H_{1K}, U_2^H H_{2K}, \ldots, U_{(K-1)}^H H_{(K-1)K}) = T_K.$$

Transmitting of the precoding matrix satisfies a condition $V_l \in \text{null}(T_l)$.

When each receiver designs the receiving matrix $U_k$ and the precoding matrix $V_l$, a local CSI matrix $H_{kl}(l \neq k)$ and $T_1, \ldots, T_k$ obtained by interaction of the receivers are needed, so the model for implementing interference alignment of this embodiment may complete alignment and eliminate interference operations of all undesired transmitters by interaction of a small amount of information between the receivers. Based on codebook quantization and feedback of the precoding matrix, according to a certain criterion, a matrix $V'_l$ (also expressed as V') most similar to the precoding matrix $V_l$ (also expressed as V) is selected from the codebook selected by each receiver, and index numbers of $V_l$ and the codebook are fed back to the corresponding transmitter. Several bits are only needed to feed back the index numbers, thus reducing the feedback quantity.

Each receiver calculates a receiving matrix $U'_l$ (also expressed as U') again according to the quantized precoding matrix $V'_l$ and an interference alignment conditional expression (1).

The transmitter transmits a signal by using the precoding matrix $V'_l$ indicated by feedback information, and the receiver filters the signal by using the updated receiving matrix $U'_l$ to implement interference alignment.

A configuration process of the system transmitter is: storing the codebook set, selecting the codebook and the precoding matrix $V'_l$ according to the feedback information, and sending the signal via $V'_l$.

A configuration process of the system receiver is: storing the codebook set, designing the precoding matrix V and the receiving matrix U according to CSI and the interference alignment condition, selecting the appropriate codebook, selecting the matrix V' most similar to V from the codebook according to a certain criterion, feeding back the index number of the codebook and the index number of the precoding matrix calculating the receiving matrix $U'_l$ again according to V' and the interference alignment condition, and filtering a receiving signal by using the receiving matrix $U'_l$.

The technical solutions of the present document will be introduced below by a specific embodiment.

For the characteristics that the ideal CSIT cannot be obtained in the LTE-FDD system, this embodiment provides a model for implementing interference alignment on the basis of codebook design and selection. The model designs interference alignment at the receiver, and feeds back the precoding matrix to the transmitter based on the codebook.

Figure 2:
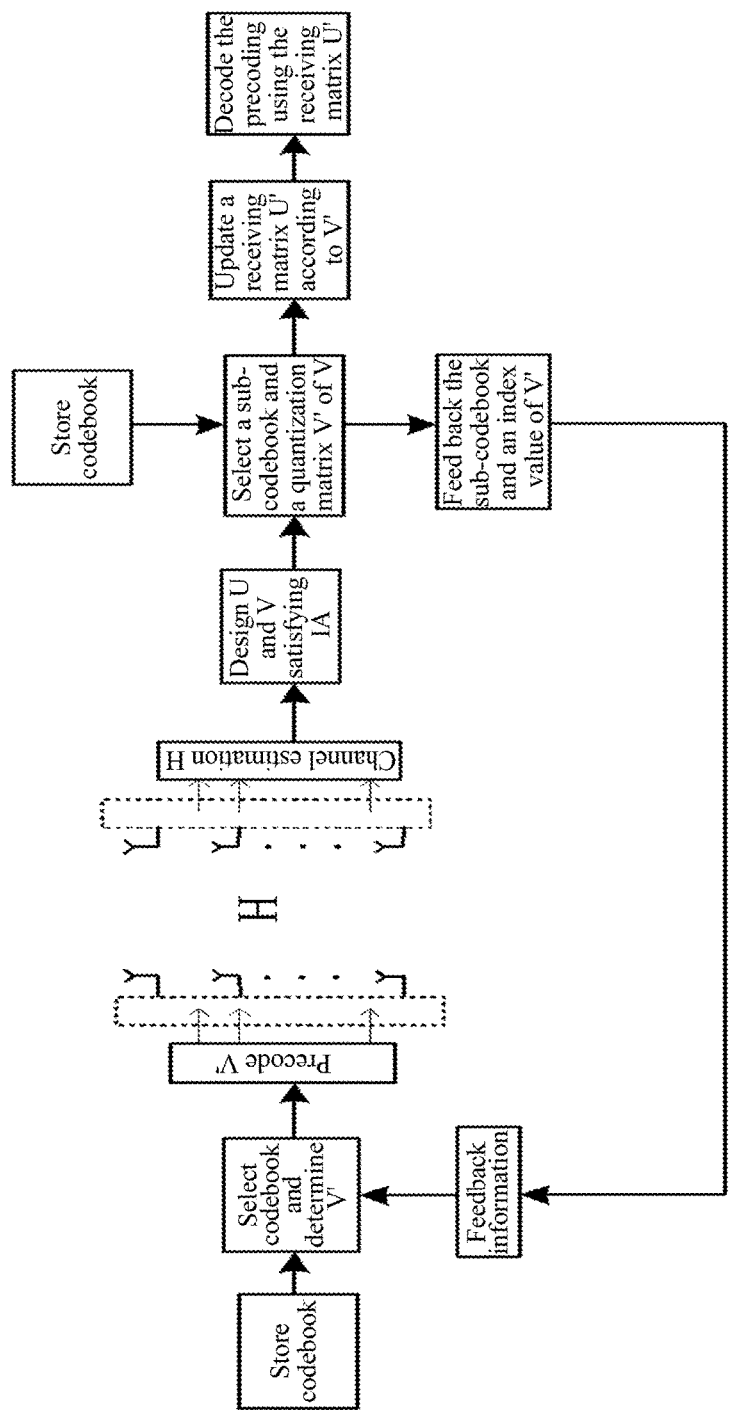
FIG. 2 is a block diagram of a model for implementing interference alignment based on codebook design and selection in an LTE-FDD system according to an embodiment of the present document.

FIG. 2 is a block diagram of a model for implementing interference alignment based on codebook design and selection in an LTE-FDD system according to an embodiment of the present document. As shown in FIG. 2, in a multi-cell single-user MIMO system, provided that antenna configurations of the receiver and the transmitter are M and N respectively, the number of data streams desired by each user is $d_s$, a signal received at the $k^{th}$ user is $$y_k = H_{kk} V_k S_k + \sum_{l=k, l \neq k}^{K} H_{kl} V_l S_l + n_k,$$

and an effective signal filtered by the receiving matrix is $$z_k = U^H y_k = U^H H_{kk} V_k S_k + U^H \sum_{l=k, l \neq k}^{K} H_{kl} V_l S_l + \tilde{n}_k. \quad (3)$$

According to this signal model, interference alignment is to design the precoding matrix V and the receiving matrix U to satisfy the conditions in Formula (1). Suppose the receiver may obtain ideal CSI H, the model for implementing interference alignment based on codebook design and selection provided by the present document is that: firstly, a codebook of a precoding matrix is designed according to the idea of Grassmann codebook, and this codebook is stored at the transmitter and the receiver respectively; the receiver or the transmitter selects the appropriate codebook according to factors such as V, a feedback capacity allowed by the system, and the number of data streams to be sent by a UE, and explicitly or implicitly notifies the opposite end; then, the receiver calculates the precoding matrix V and the receiving matrix U according to the monitored CSI H and an interference alignment algorithm; a matrix V' most similar to V is selected from the codebook based on a certain principle to serve as a final precoding matrix, and a serial number of V' and a serial number of the codebook are fed back to the transmitter; and finally, the receiver updates the receiving matrix to obtain U' according to the selected V' and the interference alignment condition to serve as a final receiving matrix.

The precoding matrix and the receiving matrix for interference alignment are both calculated according to the ideal CSI, the error is lower, the degree of matching is high, and an ideal interference alignment performance can be approached. The design of interference alignment needs local information of each receiver and information $T_1, \ldots, T_k$ obtained by interaction of the receivers, so the model for implementing interference alignment of the present document may complete alignment and eliminate interference operations of all undesired transmitters by interaction of a small amount of information between the receivers, thus reducing the implementation complexity in interference alignment. The codebook is designed and selected according to the interference alignment condition, and when the precoding matrix is fed back to the transmitter, several bits are only needed to indicate the serial number of the selected codebook and the serial number of the precoding matrix, thus greatly reducing the feedback quantity. The design of the codebook is related to the number of transmitting antennae and the number of data streams of each user. Codebooks of different sizes are designed according to the feedback quantity of the system and quantization error requirements to form the codebook set, and the system adaptively selects a codebook of an appropriate size to obtain optimal performances.

The model for implementing interference alignment based on codebook design and selection, in the LTE-FDD system needs to design a precoding codebook suitable for an interference alignment system.

The present document selects the idea of Grassmann codebook as the basis of design of the precoding codebook. Suppose a distance between vectors is defined as Formula (4), the design of precoding requires the distance between all column vectors of a matrix to be as large as possible to reduce interference between data streams.

$$d(g_k, g_l) = \sqrt{1 - (g_k^H g_l)^2} \quad (4)$$

It is provided that in a K-cell multi-antenna system where each cell has a user, the number of antennae of each transmitter is M, the number of data streams of each user is $d_s$, and elements of a transmitting matrix are plural. According to the idea of Grassmann codebook, a plural Euclidean space $C^M$ is selected, and an S-dimension subspace is found ($S \leq M$), such that this subspace is most similar to a Grassmann space D(M,S) of $C^M$. That is, a set $G_S = (g_1, g_2, \ldots g_S)$ is found, such that a minimum distance between vectors in the set is maximal, $$G_S = (g_1, g_2, \ldots g_S) = \underset{g_1, g_2, \ldots g_S \in C^M}{\mathrm{argmax}} \left[ \min_{1 \leq k < l \leq S} d(g_k, g_l) \right] \quad (5)$$

where the dimensionality of the subspace $G_S$ may be selected as different sizes, and provided that the number of data streams of each user is $d_s$, the selection range of the dimensionality of the subspace $G_S$ is $d_s \leq S \leq M$.

Based on the vectors in the space $G_S$, a precoding matrix codebook is constructed according to the number of users in the system and the number of data streams of each user: the system has K users, and the number of data streams of each user is $d_s$, so any $d_s$ vectors in $G_S$ are selected as column vectors of a matrix $W_i$ (i=1, 2, ... L) to construct a precoding codebook $\Omega_S = (W_1, W_2, \ldots W_L)$. Thus, $L = C_S^{d_s}$. Moreover, by changing the dimensionality of the subspace $G_S$, codebooks of different sizes may be obtained. The bigger the dimensionality of the subspace $G_S$ is, the more the precoding matrices constituted by the vectors in $G_S$ are, that is, the codebook is larger. The codebooks of different sizes are designed according to the abovementioned idea to constitute a codebook set $$(\Omega_{S_1}, \Omega_{S_2}, \ldots, \Omega_{S_{M-d_s+1}}),$$

and this codebook set is stored at the transmitter and the receiver.

In the system, in order to balance errors caused by the complexity in codebook selection, the size of the feedback quantity and the quantization of the precoding matrix, an appropriate codebook size may be selected according to the requirements of the system. Firstly, in an uplink channel of a communication system, a capacity for information feedback from the receiver to the transmitter is limited, and the larger the codebook is, the greater the channel capacity occupied by a serial number capable of uniquely indicating the precoding matrix is, therefore, in order to reduce the feedback quantity, a size of the codebook is as small as possible, that is, a dimensionality of the subspace $G_S$ is as small as possible. Secondly, the larger the codebook is, the greater the overhead for searching the codebook for a matrix is, that is, the quantization precoding operation is more complicated. Finally, the matrix selected from the codebook is not completely identical to an ideal precoding matrix, and a certain quantization error exists; and the more the matrices in the codebook are, the greater the probability of finding a matrix having the highest similarity to the ideal precoding matrix is, so the size of the codebook affects the quantization error of the precoding matrix. If the limitation of the feedback capacity and the search overhead for codebook selection are not taken into consideration, it may be directly allowed that S=M, such that a minimum quantization error may be obtained.

The model for implementing interference alignment based on codebook design and selection in the LTE-FDD system needs to design a precoding matrix and a receiving matrix at the receiver to implement interference alignment.

The precoding matrix V and the receiving matrix U satisfy the conditions in Formula (1), so V and U are needed for interference alignment and interference elimination respectively. In the present document, the receiving matrix U is used for interference alignment, so all receiving matrices are co-designed according to Formula (2). For example, an equivalent condition in Formula (2) for a receiving matrix $U_k$ of a $k^{th}$ receiver is:

$$\begin{bmatrix} I_M & 0 & \cdots & \cdots & 0 & -H_{k1}^H \\ 0 & I_M & & & 0 & -H_{k2}^H \\ \vdots & \vdots & \ddots & & \vdots & \vdots \\ 0 & 0 & \cdots & I_M & 0 & -H_{k(k-1)}^H \\ 0 & 0 & \cdots & & I_M & 0 & -H_{k(k+1)}^H \\ \vdots & \vdots & & & \ddots & \vdots & \vdots \\ 0 & 0 & & & I_M & -H_{kk}^H \\ 0 & 0 & 0 & \cdots & \cdots & 0 & 0 \end{bmatrix} \begin{bmatrix} T_1 \\ T_2 \\ \vdots \\ T_{k-1} \\ T_{k+1} \\ \vdots \\ T_K \\ U_k \end{bmatrix} = 0 \quad (6)$$

Conditions satisfied by other receiving matrices are similar. From Formula (6), it may be seen that calculation of the receiving matrix $U_k$ needs local channel information $H_{kl}$ ($l \neq k$) and $T_1, \ldots, T_k$ obtained by interaction between the receivers.

As long as the precoding matrix of each transmitter is orthogonal to interference formed thereby, the interference may be eliminated, $$V_l \in \text{null}(T_l) \quad (7)$$

The model for implementing interference alignment based on codebook design and selection in the LTE-FDD system needs to select an appropriate codebook to serve as a codebook for quantizing the precoding matrix. A codebook set stored at the transmitter and the receiver has codebooks of different sizes, and the sizes of the codebooks affect the number of bits needed by feedback and the quantization error of the precoding matrix. In the present document, a codebook of an appropriate size is selected according to a maximum feedback capacity of the system and an allowed maximum quantization error probability.

It is provided that the size of the selected codebook is N. On one hand, provided that a maximum channel capacity for feedback is $b_{max}$ bits, the size of the selected codebook shall satisfy a condition: $N \leq 2^{b_{max}}$.

On the other hand, the quantization error of the precoding matrix is related to the size of the codebook. In the summary 4 of the present document, according to the principle of Grassmann linear boxing, the probability of containing any one M-dimension vector a(M,1) in the Grassmann space $G_S = (g_1, g_2, \ldots g_S)$ is $\Delta(G_S) = S\left(\frac{\delta(G_S)}{2}\right)^{2(M-1)}$, where $\delta(G_S) = \min_{1 \leq k \leq l \leq S} d(g_k, g_l), (g_k, g_l \in G_S)$.

Therefore, when the number of transmitting antennae is M and the number of data streams of users is $d_s$, the probability of error in quantizing the precoding matrix V into a matrix in a codebook $\Omega_S = (W_1, W_2, \ldots W_L)$ is, $$\Delta_L = 1 - (\Delta(G_S))^{d_s} = 1 - S\left(\frac{\delta(G_S)}{2}\right)^{2d_s(M-1)} \quad (8)$$

here $L = C_S^{d_s}$. Provided that the maximum error probability allowed by the system is $\rho_{max}$ during quantization of the precoding matrix V, the size of the selected codebook shall satisfy a condition $\Delta_N \leq \rho_{max}$. According to Formula (8), the size of the Grassmann space satisfying this condition is:

$$S_i \geq (1 - \rho_{max})\left(\frac{\delta(G_S)}{2}\right)^{-2d_s(M-1)}$$

That is, the size range of N is, $$N \geq C_{(1-\rho_{max})\left(\frac{\delta(G_S)}{2}\right)^{-2d_s(M-1)}}^{d_s} \quad (9)$$

In conclusion, according to a feedback capacity $b_{max}$ of the current system and the allowed quantization error $\rho_{max}$, the range of the size N of the selected codebook is $$C_{(1-\rho_{max})\left(\frac{\delta(G_S)}{2}\right)^{-2d_s(M-1)}}^{d_s} \leq N \leq 2^{b_{max}} \quad (10)$$

The model for implementing interference alignment based on codebook design and selection in the LTE-FDD system needs to quantize the precoding matrix.

Under the conditions of current feedback capacity limitations of the system and the allowed quantization error, the selected codebook is $\Omega_{S_i}$ ($i \in (1, 2, \ldots, M-d_s+1)$). In the present document, a matrix $V'_l$, most similar to $V'_l$ is selected from a codebook $\Omega_{S_i}$, to serve as a quantized precoding matrix. The method for quantizing the precoding matrix is specifically illustrated by taking a minimum chordal distance criterion as an example.

It is provided that $P_1$ and $P_2$ are direction vectors of two spaces $S_1$ and $S_2$, a chordal distance between the two spaces is defined as $$d_{chord}(S_1, S_2) = 1/\sqrt{2}\|P_1 - P_2\|_F \quad (11)$$

For a matrix A, a direction vector P capable of uniquely representing the matrix A is defined, $$P = A(A^H A)^{-1} A^H \quad (12)$$

It is provided that $P_1$ and $P_2$ are direction vectors of matrices A and B respectively, and when a chordal distance between the two matrices is $d_{chord}(A,B) = 1/\sqrt{2}\|P_1 - P_2\|_F = 0$, it is represented that the matrices A and B are identical.

Therefore, the method for quantizing the precoding matrix is:

$$V'_l = \underset{W \in \Omega_{S_i}}{\operatorname{argmin}}[d_{chord}(V_l, W)], (l = 1, 2, \ldots, K) \quad (13)$$

A serial number of the codebook $\Omega_{S_i}$ and a serial number of the precoding matrix $V'_l$ are fed back to the transmitter.

The model for implementing interference alignment based on codebook design and selection in the LTE-FDD system needs to correspondingly update the receiving matrix after quantizing the precoding matrix.

After the precoding matrix is quantized, $V'_l$ and $U_k$ are not completely matched any longer, the interference may not be eliminated. Therefore, calculation and update are performed again to obtain a receiving matrix $U_k'$ according to $V_l'$ obtained by quantization in Formula (13) and Formulae (1), (6) and (7), such that $V_l'$ and $U_k'$ still satisfy the interference alignment condition. Moreover, on the premise that the receiver may obtain ideal CSI, $V_l'$ and $U_k'$ are calculated based on the ideal CSI, so the system can obtain the ideal interference alignment performance while reducing the feedback quantity.

The technical solutions of the present document will be introduced below by another specific embodiment.

Figure 3:
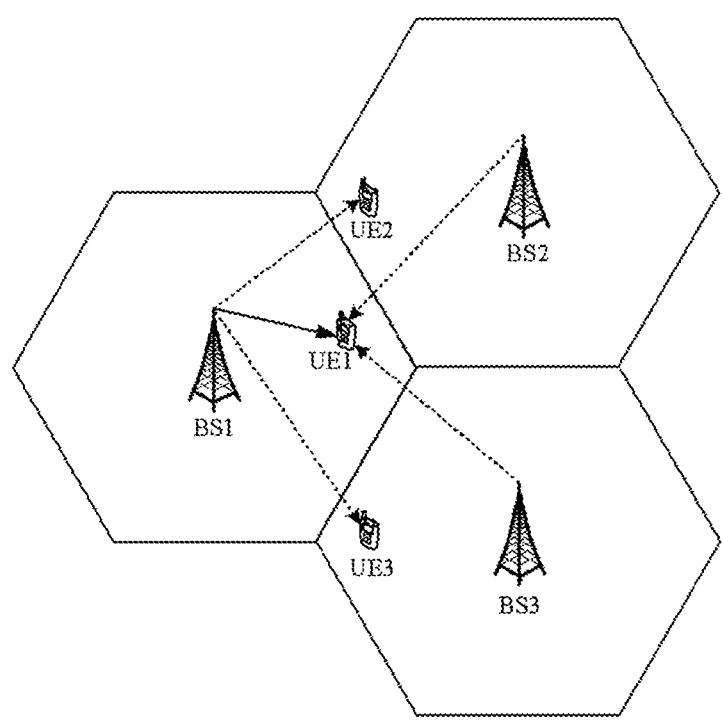
FIG. 3 is a model diagram of a three-cell and single-user MIMO system according to an embodiment of the present document.

The present embodiment is illustrated by taking that there are three cells and each cell has a user as the example. It is provided that the number of antennae at a BS is M, the number of antennae at the users is N, the number of desired data streams of each user is $d_s$, and BS power in each cell is averagely allocated. The system model diagram is a three-cell single-user MIMO system model diagram shown in FIG. 3. The steps of this embodiment are as follows.

1. In the present embodiment, a precoding codebook is designed on the basis of the idea of Grassmann codebook. A plural European space $C^M$ is selected, and an S-dimension subspace is found (S≤M), such that this subspace is most similar to a Grassmann space D(M,S) of $C^M$. That is, a set $G_S=(g_1, g_2, \ldots g_S)$ is found, such that a minimum distance between vectors in the set is maximal, $$G_S = (g_1, g_2, \ldots g_S) = \underset{g_1, g_2, \ldots g_S \in C^M}{\operatorname{argmax}} \left[ \min_{1 \le k < l \le S} d(g_k, g_l) \right]$$

here the dimensionality of the subspace $G_S$ may be selected as different sizes so as to construct codebooks of different sizes, and it is provided that the number of data streams of each user is $d_s$, the selection range of the dimensionality of the subspace $G_S$ is $d_s \le S \le M$.

Based on the vectors in the space Gs, the precoding matrix codebook is constructed according to the number of users in the system and the number of data streams of each user: the system has three users, and the number of data streams of each user is $d_s$, so any $d_s$ vectors in $G_S$ are selected as column vectors of a matrix W (i=1, 2, ... L) to construct a precoding codebook $\Omega_S=(W_1, W_2, \ldots W_L)$. Thus, $L=C_S^{d_s}$. Moreover, by changing the dimensionality of the subspace $G_S$, codebooks of different sizes may be obtained. The greater the dimensionality of the subspace $G_S$ is, the more the precoding matrices constituted by the vectors in $G_S$ are, that is, the codebook is larger. The codebooks of different sizes are designed according to the abovementioned idea to constitute a codebook set $$(\Omega_{S_1}, \Omega_{S_2}, \ldots, \Omega_{S_{M-d_s+1}}),$$

and this codebook set is stored at the transmitter and the receiver.

2. In the present embodiment, a codebook of an appropriate size is selected from the codebook set designed in Step 1 according to the maximum feedback capacity of the system, the allowed maximum quantization error probability and the like, herein codebook selection may be carried out by either the receiver or the transmitter. Specifically, the receiver or the transmitter selects an appropriate codebook from the codebook set according to the feedback capacity limitation of the current system and the number of data streams to be sent by the users, and explicitly or implicitly notifies the opposite end.

According to Step 1, there are codebooks of different sizes in the codebook set stored at the transmitter and the receiver, and the sizes of the codebooks affect the number of bits needed by feedback and the quantization error of the precoding matrix.

It is provided that the size of the selected codebook is N. On one hand, provided that a maximum channel capacity for feedback is $b_{max}$ bits, the size of the selected codebook shall satisfy a condition: $N \le 2^{b_{max}}$.

On the other hand, the quantization error of the precoding matrix is related to the size of the codebook. In the summary 4 of the present document, according to the principle of Grassmann linear boxing, the probability of containing any one M-dimension vector a(M,1) in the Grassmann space $$G_S = (g_1, g_2, \ldots g_S) \text{ is } \Delta(G_S) = S \left( \frac{\delta(G_S)}{2} \right)^{2(M-1)}, \text{ here}$$

$$\delta(G_S) = \min_{1 \le k < l \le S} d(g_k, g_l), (g_k, g_l \in G_S).$$

Therefore, when the number of transmitting antennae is M and the number of data streams of users is $d_s$, the probability of error in quantizing the precoding matrix V into a matrix in a codebook $\Omega_S=(W_1, W_2, \ldots W_L)$ is, $$\Delta_L = 1 - (\Delta(G_S))^{d_s} = 1 - S \left( \frac{\delta(G_S)}{2} \right)^{2d_s(M-1)} \quad (14)$$

here $L=C_S^{d_s}$. It is provided that the maximum error probability allowed by the system is $\rho_{max}$ during quantization of the precoding matrix V, the size of the selected codebook shall satisfy a condition $\Delta_N \le \rho_{max}$. According to Formula (14), the size of the Grassmann space satisfying this condition is:

$$S_i \ge (1 - \rho_{max}) \left( \frac{\delta(G_S)}{2} \right)^{-2d_s(M-1)}$$

That is, the size range of N is, $$N \ge C^{d_s}_{(1-\rho_{max}) \left( \frac{\delta(G_S)}{2} \right)^{-2d_s(M-1)}} \quad (15)$$

In conclusion, according to a feedback capacity $b_{max}$ of the current system and the allowed quantization error $\rho_{max}$, the range of the size N of the selected codebook is $$C_{(1-\rho_{max})\left(\frac{\delta(G_S)}{2}\right)^{-2d_S(M-1)}}^{d_s} \le N \le 2^{b_{max}} \quad (16)$$

3. In the present embodiment, a precoding matrix and a receiving matrix are designed at each receiver according to an interference alignment condition.

In the present embodiment, suppose the receiver has ideal CSI, design of interference alignment at the receiver facilitates reduction of the influence on the system performance caused by non-ideal CSI. There are three transmitters and three receivers in the system, so conditions to be satisfied by the precoding matrix of each transmitter and the receiving matrix of the receiver are:

$$U_k^H H_{kl} V_l = 0, \forall k \ne l$$

$$\text{rank}(U_k^H H_{kk} V_k) = d_s, \forall k \in (1,2,3) \quad (17)$$

If interference of each transmitter with all of other non-serving users is aligned through the receiving matrix, according to the interference alignment condition in Formula (11), the receiving matrix of each receiver needs to satisfy a condition:

$$\text{span}(U_2^H H_{21}, U_3^H H_{31}) = T_1$$

$$\text{span}(U_1^H H_{12}, U_3^H H_{32}) = T_2$$

$$\text{span}(U_2^H H_{23}, U_1^H H_{13}) = T_3 \quad (18)$$

here $T_i$ (i=1, 2, 3) is a space to which interference formed for all non-serving users by a transmitter i is aligned. Calculation of conditions satisfied by $U_1$ in Formula (15) is equivalent to, $$\begin{bmatrix} I_M & 0 & -H_{12}^H \\ 0 & I_M & -H_{13}^H \end{bmatrix} \begin{bmatrix} T_2 \\ T_3 \\ U_1 \end{bmatrix} = 0 \quad (19)$$

Other receiving matrices are similar. From Formulae (15) and (16), it may be seen that calculation of the receiving matrix $U_i$ (i=1, 2, 3) needs local channel information $H_{ij}$(j≠i) and $T_1, \ldots, T_k$ obtained by interaction between the receivers.

As long as the precoding matrix of each transmitter is orthogonal to interference formed thereby, the interference may be eliminated, $$V_j \in \text{null}(I_j)(j=1,2,3) \quad (20)$$

4. In the present embodiment, the precoding matrix is quantized, and fed back to the transmitter.

According to the current feedback capacity limitation of the system and the allowed quantization error, a codebook $\Omega_{S_i}$ (i=1, 2, . . . , M−$d_s$+1) satisfying the condition is selected from the codebook set $$(\Omega_{S_1}, \Omega_{S_2}, \ldots, \Omega_{S_{M-d_s+1}})$$

designed in Step 1. In the present document, a matrix $V'_j$ most similar to $V_j$ is selected from a codebook $\Omega_{S_i}$ to serve as a quantized precoding matrix according to a certain criterion. In the present embodiment, the precoding matrix is quantized according to a minimum chordal distance criterion, herein a chordal distance between spaces is defined as follows. If $P_1$ and $P_2$ are direction vectors of two spaces $S_1$ and $S_2$ respectively, a chordal distance between the two spaces is defined as $$d_{chord}(S_1, S_2) = 1/\sqrt{2} \|P_1 - P_2\|_F \quad (21)$$

For a matrix A, a direction vector P capable of uniquely representing the matrix A is defined, $$P = A(A^H A)^{-1} A^H \quad (22)$$

It is provided that $P_1$ and $P_2$ are direction vectors of matrices A and B respectively, and when a chordal distance between the two matrices is $d_{chord}(A,B) = 1/\sqrt{2} \|P_1 - P_2\|_F = 0$, it is represented that the matrices A and B are identical.

Therefore, the method for quantizing the precoding matrix is:

$$V'_j = \underset{W \in \Omega_{S_i}}{\text{argmin}}[d_{chord}(V_j, W)], (j = 1, 2, 3) \quad (23)$$

A serial number of the codebook $\Omega_{S_i}$ and a serial number of the precoding matrix $V'_j$ are fed back to the transmitter.

5. In the present embodiment, the receiving matrix is updated after the precoding matrix is quantized.

After the precoding matrix is quantized, $V'_i$ and $U_i$ are not completely matched any longer, the interference may not be eliminated. Therefore, calculation and update are performed again to obtain a receiving matrix $U_i'$ according to $V_i'$ obtained by quantization in Formula (23) and Formulae (17), (19) and (20), such that $V_i'$ and $U_i'$ satisfy the following condition:

$$(U'_i)^H H_{ij} V'_j = 0, \forall j \ne i$$

$$\text{rank}((U'_i)^H H_{ii} V'_i) = d_s, \forall i \in (1,2,3) \quad (24)$$

On the premise that the receiver may obtain ideal CSI, $V_j'$ and $U_i'$ are calculated based on the ideal CSI, so the system can obtain the ideal interference alignment performance while reducing the feedback quantity.

Figure 4:
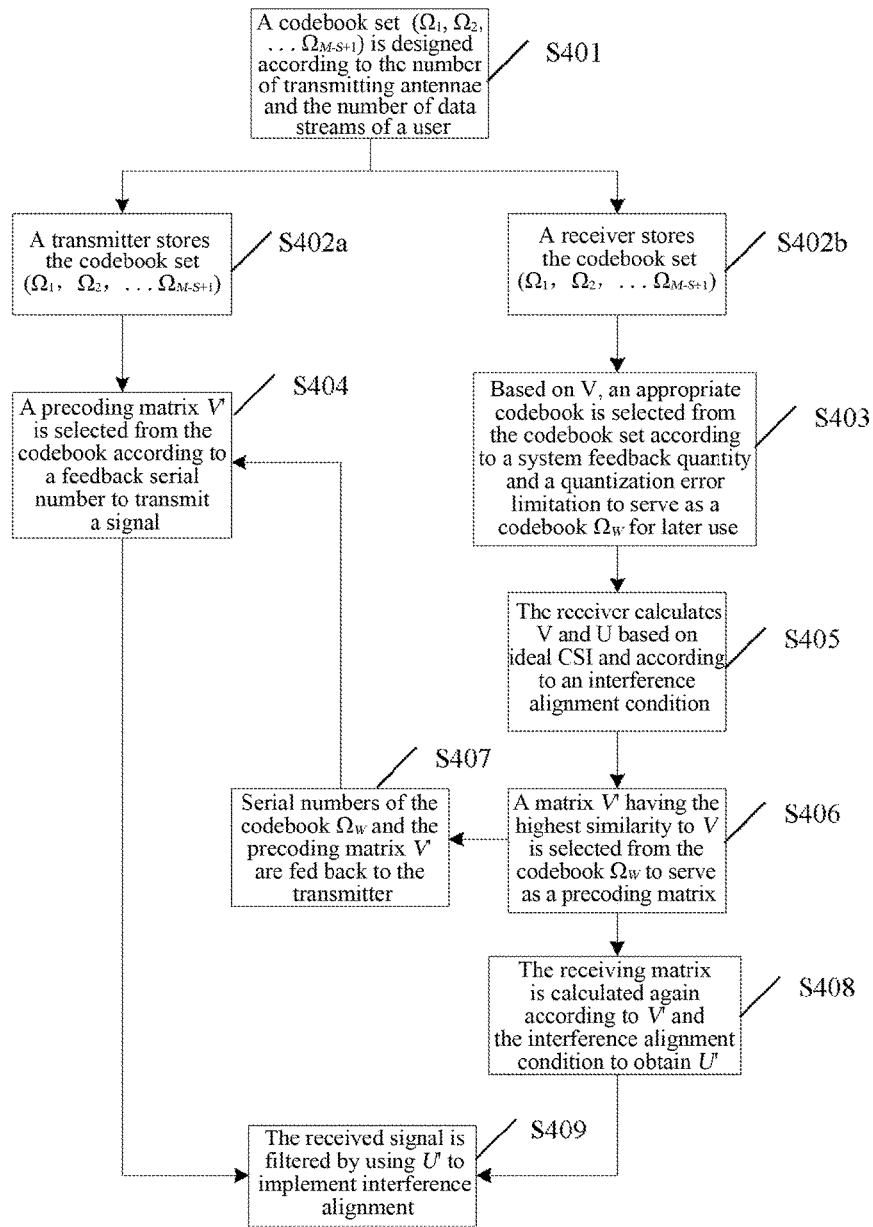
FIG. 4 is a flowchart of a model for implementing interference alignment based on codebook design and selection in an LTE-FDD system according to an embodiment of the present document.

FIG. 4 is a flowchart of a model for implementing interference alignment based on codebook design and selection in an LTE-FDD system according to an embodiment of the present document. As shown in FIG. 4, the flow includes the following steps.

In Step S401, A receiver and a transmitter design a codebook set ($\Omega_{S_1}, \Omega_{S_2}, \ldots, \Omega_{M-S+1}$) according to the number of transmitting antennae and the number of data streams of a user.

In Step S402a, The transmitter stores the codebook set ($\Omega_{S_1}, \Omega_{S_2}, \ldots, \Omega_{M-S+1}$). Then, Step S403 is executed.

In Step S402b, The receiver stores the codebook set ($\Omega_{S_1}, \Omega_{S_2}, \ldots, \Omega_{M-S+1}$). Then, Step S404 is executed.

In Step S403, Based on a precoding matrix V, the receiver selects an appropriate codebook from the codebook set according to a system feedback quantity and a quantization error limitation to serve as a codebook $\Omega_W$ for later use. Then, Step S405 is executed.

In Step S404, The transmitter selects the precoding matrix from the codebook according to a feedback serial number to transmit a signal V'. Then, Step S409 is executed.

In Step S405, The receiver calculates the precoding matrix V and a receiving matrix U based on ideal CSI and an interference alignment condition.

In Step S406, A precoding matrix having the highest similarity is selected from the codebook $\Omega_W$ to serve as a precoding matrix V'. Then, Step S407 and Step S408 are executed.

In Step S407, Serial numbers of the codebook $\Omega_W$ and the precoding matrix V' are fed back to the transmitter. Then, Step S404 is executed.

In Step S408, The receiving matrix U is calculated again according to the precoding matrix V' and the interference alignment condition to obtain a receiving matrix U'.

In Step S409, The received signal is filtered according to the receiving matrix U' to implement interference alignment.

The present embodiment provides a model for implementing interference alignment based on codebook design and selection, which is applied to an LTE-FDD system. According to the characteristics of a precoding matrix for interference alignment, the number of transmitting antennae and the number of data streams of users, a codebook set of codebooks of different sizes is designed, and a transmitter and a receiver store the codebook set. At the receiver, according to ideal CSI, a precoding matrix and a receiving matrix for interference alignment are designed, an appropriate codebook is selected from the codebook set, the precoding matrix is quantized into a matrix in this codebook, and index numbers of this codebook and the matrix are fed back to the transmitter. According to the interference alignment condition and the quantized precoding matrix, the receiving matrix is calculated again, such that a processed interference signal is zero, and the dimensionality of a desired signal satisfies transmission of the data streams.

Figure 5:
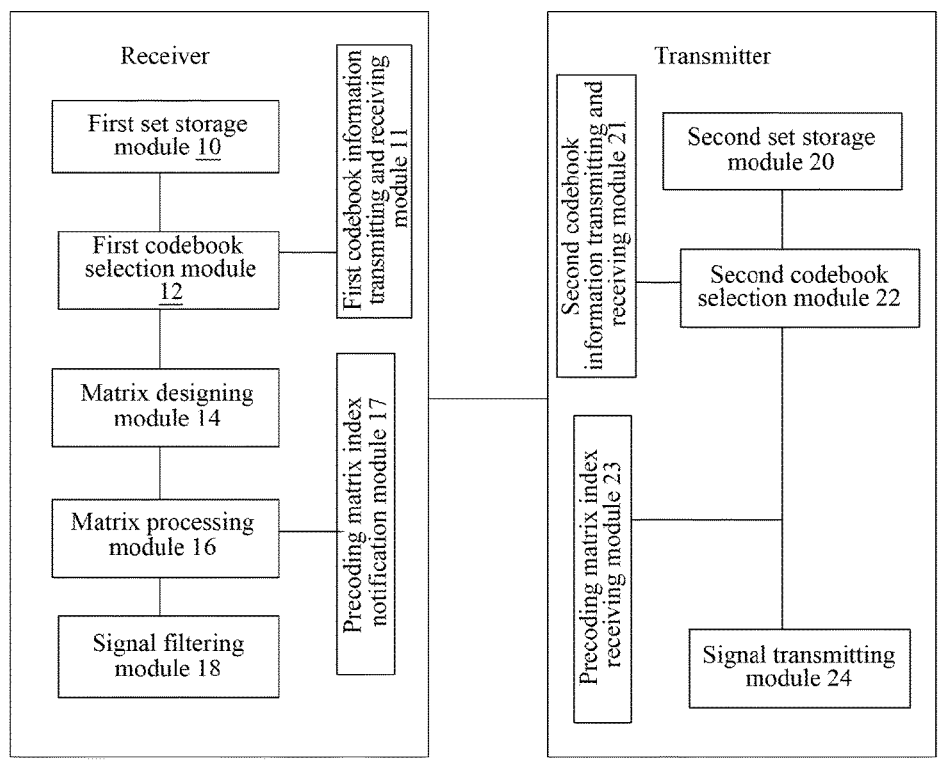
FIG. 5 is a structure diagram of an apparatus for implementing interference alignment based on codebook design and selection according to an embodiment of the present document.

In correspondence to the method for implementing interference alignment based on codebook design and selection introduced by the abovementioned embodiment, the present embodiment provides an apparatus for implementing interference alignment based on codebook design and selection, which is arranged to implement the abovementioned embodiment. FIG. 5 is a structure diagram of an apparatus for implementing interference alignment based on codebook design and selection according to an embodiment of the present document. As shown in FIG. 5, the apparatus includes a receiver and a transmitter, herein the receiver includes:

a first set storage module 10, arranged to store, pre-design a codebook set of a precoding matrix, herein the codebook set includes codebooks of different sizes;

a first codebook selection module 12, connected to the first set storage module 10, and arranged to select a codebook satisfying a specified condition from the codebook set to serve as a current codebook;

a first codebook information transmitting and receiving module 11, connected to the first codebook selection module 12, and arranged to explicitly or implicitly notify the transmitter of the current codebook, or receive an explicit or implicit notification of the current codebook from the transmitter;

a matrix designing module 14, connected to the first codebook selection module 12, and arranged to design, based on obtained ideal CSI and an interference alignment condition, a precoding matrix V and a receiving matrix U arranged to implement interference alignment;

a matrix processing module 16, connected to the matrix designing module 14, and arranged to select a matrix V' having the highest similarity to the precoding matrix V from the current codebook to serve as a finally quantized precoding matrix V'; and calculate, based on the quantized precoding matrix V', the receiving matrix U again to obtain a receiving matrix U' according to the interference alignment condition;

a precoding matrix index notification module 17, connected to the matrix processing module 16, and arranged to notify the transmitter of an index number of the quantized precoding matrix V'; and a signal filtering module 18, connected to the matrix processing module 16, and arranged to filter a signal according to the receiving matrix U' to implement interference alignment.

The transmitter includes:

a second set storage module 20, arranged to store, pre-design a codebook set of a precoding matrix; herein the codebook set includes codebooks of different sizes;

a second codebook selection module 22, connected to the second set design module 20, and arranged to select a codebook satisfying a specified condition from the codebook set to serve as a current codebook;

a second codebook information transmitting and receiving module 21, connected to the second codebook selection module 20, and arranged to explicitly or implicitly notify the receiver of the current codebook, or receive an explicit or implicit notification of the current codebook from the receiver;

a precoding matrix index receiving module 23, connected to the second codebook selection module 22, and arranged to receive a precoding matrix index number notification from the receiver; and a signal transmitting module 24, connected to the second codebook selection module 22, and arranged to transmit a signal by using the quantized precoding matrix V' according to the precoding matrix index number information fed back by the receiver to implement interference alignment.

In this embodiment, the precoding matrix and the receiving matrix are well matched, and ideally satisfy the interference alignment condition. In addition, suppose CSI at the receiver is ideal, interference alignment design is performed at the receiver based on this information, such that the influence on interference alignment caused by the non-ideal CSI due to feedback may be avoided. Moreover, the precoding matrix is fed back to the transmitter based on the codebook, thus reducing the feedback quantity.

In the present embodiment, the first set storage module 10 includes: a first design unit, arranged to design, according to the transmitting antenna number configuration of a multi-cell multi-antenna system and the number of data streams to be sent by a user in this system, a codebook set of codebooks of different sizes; and a first storage unit, arranged to store the codebook set.

The second set storage module 20 includes: a second design unit, arranged to design, according to the transmitting antenna number configuration of the multi-cell multi-antenna system and the number of the data streams to be sent by the user in this system, a codebook set of codebooks of different sizes; and a second storage unit, arranged to store the codebook set.

In the present embodiment, the abovementioned codebook selection module 14 includes: a codebook selection unit, arranged to select, according to a feedback capacity limitation of the current system and a quantization error range allowed by the system, a codebook from the codebook set to serve as the current codebook.

In the technical solutions of the embodiments of the present document, the precoding matrix and the receiving matrix are well matched, and ideally satisfy the interference alignment condition. In addition, suppose CSI at the receiver is ideal, interference alignment design is performed at the receiver based on this information, such that the influence on interference alignment caused by the non-ideal CSI due to feedback may be avoided. Moreover, the precoding matrix is fed back to the transmitter based on the codebook, thus reducing the feedback quantity.

Those skilled in the art may understand that all or some of the steps in the abovementioned embodiments may be implemented by using a computer program flow. The computer program may be stored in a computer-readable storage medium. The computer program is executed on a corresponding hardware platform. During execution, one or a combination of the steps in the method embodiment may be included.

Alternatively, all or some of the steps in the abovementioned embodiments may also be implemented by using an integrated circuit. These steps may be manufactured into integrated circuit modules separately, or a plurality of modules or steps therein may be manufactured into a single integrated circuit module. Thus, the present document is not limited to any specific hardware and software combination.

Each apparatus/function module/function unit in the abovementioned embodiments may be implemented by using a general calculation apparatus. They may be centralized on a single calculation apparatus, or may also be distributed on a network constituted by a plurality of calculation apparatuses.

When being implemented in form of software function module and sold or used as an independent product, each apparatus/function module/function unit in the abovementioned embodiment may be stored in the computer-readable storage medium. The abovementioned computer-readable storage medium may be a read-only memory, a magnetic disk or a compact disc, etc.

Any technician skilled in the technical art may easily think of changes or replacements within the technical scope disclosed by the present document, and these changes or replacements shall fall within the scope of protection of the present document. Therefore, the scope of protection of the present document shall refer to the scope of protection according to claims.

INDUSTRIAL APPLICABILITY

Method and apparatus for implementing interference alignment based on codebook design and selection are disclosed by the embodiments of the present document, and the precoding matrix and the receiving matrix are well matched, which ideally satisfies the interference alignment condition. In addition, suppose the CSI at the receiver is ideal, interference alignment design is performed at the receiver based on this information, such that the influence on interference alignment caused by the non-ideal CSI due to feedback may be avoided. Moreover, the precoding matrix is fed back to the transmitter based on the codebook, thus reducing the feedback quantity.

What we claim is:

1. A method for implementing, by a receiver, interference alignment based on codebook design and selection, comprising the following steps:
    a first set storage circuit pre-designing or pre-storing a codebook set of a precoding matrix, wherein the codebook set comprises codebooks of different sizes;
    a first codebook selection circuit selecting a codebook satisfying a specified condition from the codebook set to serve as a current codebook;
    a first codebook information transmitting and receiving circuit explicitly or implicitly notifying a transmitter of the current codebook, or receiving an explicit or implicit notification of the current codebook from the transmitter;
    a matrix designing circuit designing, based on obtained ideal Channel State Information CSI and an interference alignment condition, a precoding matrix V and a receiving matrix U arranged to implement interference alignment;
    a matrix processing circuit selecting a matrix V' having a highest similarity to the precoding matrix V from the current codebook to serve as a finally quantized precoding matrix V', and calculating, based on the quantized precoding matrix V', the receiving matrix U again to obtain a receiving matrix U' according to the interference alignment condition;
    a precoding matrix index notification circuit notifying the transmitter of an index number of the quantized precoding matrix V'; and
    a signal filtering circuit filtering a signal according to the receiving matrix U' to implement interference alignment.

2. The method according to claim 1, wherein said pre-designing or pre-storing a codebook set of a precoding matrix comprises:
    designing, according to a transmitting antenna number configuration of a multi-cell multi-antenna system and a number of data streams to be sent by a user in the system, a codebook set of codebooks of different sizes and storing the codebook set, or pre-storing a codebook set.

3. The method according to claim 1, wherein selecting a codebook satisfying a specified condition from the codebook set to serve as a current codebook comprises:
    selecting, according to a feedback capacity limitation of the current system and a quantization error range allowed by the system, a codebook from the codebook set to serve as the current codebook.

4. The method according to claim 1, wherein after the matrix V' having the highest similarity to the precoding matrix V is selected from the current codebook to serve as the finally quantized precoding matrix V', the method further comprises:
    feeding back the index number of the quantized precoding matrix V' to the transmitter; or,
    indicating the index number of the quantized precoding matrix V' to the transmitter.

5. A non-transitory computer-readable medium carrying a computer program, wherein the computer program comprises program instructions, which, when executed by a receiver device, enable the receiver device to carry out the method according to claim 1.

6. A method for implementing, by a transmitter, interference alignment based on codebook design and selection, comprising the following steps:
    a second set storage circuit pre-designing or pre-storing a codebook set of a precoding matrix; wherein the codebook set comprises codebooks of different sizes;
    a second codebook selection circuit selecting a codebook satisfying a specified condition from the codebook set to serve as a current codebook;
    a second codebook information transmitting and receiving circuit explicitly or implicitly notifying a receiver of the current codebook, or receiving an explicit or implicit notification of the current codebook from the receiver; and a precoding matrix index receiving circuit receiving an index number of a quantized precoding matrix V' sent by the receiver; and
a signal transmitting circuit transmitting a signal by using the quantized precoding matrix V' according to the index number,
wherein the quantized precoding matrix V' is determined by the receiver via the following way:
designing, based on obtained ideal CSI and an interference alignment condition, a precoding matrix V arranged to implement interference alignment, and selecting a matrix V' having a highest similarity to the precoding matrix V from the current codebook to serve as the finally quantized precoding matrix V'.

7. The method according to claim 6, wherein said pre-designing or pre-storing a codebook set of a precoding matrix comprises:
designing, according to a transmitting antenna number configuration of a multi-cell multi-antenna system and a number of data streams to be sent by a user in the system, a codebook set of codebooks of different sizes and storing the codebook set, or pre-storing a codebook set.

8. The method according to claim 6, wherein selecting a codebook satisfying a specified condition from the codebook set to serve as a current codebook comprises:
selecting, according to a feedback capacity limitation of the current system and a quantization error range allowed by the system, a codebook from the codebook set to serve as the current codebook.

9. The method according to claim 6, wherein receiving an index number of a quantized precoding matrix V' sent by the receiver comprises: receiving feedback information or indication information sent by the receiver.

10. A non-transitory computer-readable medium carrying the computer program, wherein the computer program comprises program instructions, which, when executed by a transmitter device, enable the transmitter device to carry out the method according to claim 6.

11. An apparatus for implementing, by a receiver, interference alignment based on codebook design and selection, comprising:
a first set storage circuit, arranged to store, pre-design a codebook set of a precoding matrix; wherein the codebook set comprises codebooks of different sizes;
a first codebook selection circuit, arranged to select a codebook satisfying a specified condition from the codebook set to serve as a current codebook;
a first codebook information transmitting and receiving circuit, arranged to explicitly or implicitly notify a transmitter of the current codebook, or receive an explicit or implicit notification of the current codebook from the transmitter;
a matrix designing circuit, arranged to design, based on obtained ideal CSI and an interference alignment condition, a precoding matrix V and a receiving matrix U arranged to implement interference alignment;
a matrix processing circuit, arranged to select a matrix V' having a highest similarity to the precoding matrix V from the current codebook to serve as a finally quantized precoding matrix V', and calculate, based on the quantized precoding matrix V', the receiving matrix U again to obtain a receiving matrix U' according to the interference alignment condition;
a signal filtering circuit, arranged to filter a signal according to the receiving matrix U' implement interference alignment; and a precoding matrix index notification circuit, arranged to notify the transmitter of an index number of the quantized precoding matrix V'.

12. The apparatus according to claim 11, wherein the first set storage circuit comprises:
a first design circuit, arranged to design, according to a transmitting antenna number configuration of a multi-cell multi-antenna system and a number of data streams to be sent by a user in the system, a codebook set of codebooks of different sizes; and
a first storage circuit, arranged to store the codebook set.

13. The apparatus according to claim 11, wherein the first codebook selection circuit comprises:
a codebook selection circuit, arranged to select, according to a feedback capacity limitation of the current system and a quantization error range allowed by the system, a codebook from the codebook set to serve as the current codebook.

14. The apparatus according to claim 11, wherein
the precoding matrix index notification circuit is arranged to feed back or indicate the index number of the quantized precoding matrix V' to the transmitter.

15. An apparatus for implementing, by a transmitter, interference alignment based on codebook design and selection, comprising:
a second set storage circuit, arranged to store, pre-design a codebook set of a precoding matrix; wherein the codebook set comprises codebooks of different sizes;
a second codebook selection circuit, arranged to select a codebook satisfying a specified condition from the codebook set to serve as a current codebook;
a second codebook information transmitting and receiving circuit, arranged to explicitly or implicitly notify a receiver of the current codebook, or receive an explicit or implicit notification of the current codebook from the receiver;
a precoding matrix index receiving circuit, arranged to receive index number information of a quantized precoding matrix V' sent by the receiver; and
a signal transmitting circuit, arranged to transmit a signal by using the quantized precoding matrix V' according to information received by the precoding matrix index receiving circuit to implement interference alignment;
wherein the quantized precoding matrix V' is determined by the receiver via the following way:
designing, based on obtained ideal CSI and an interference alignment condition, a precoding matrix V arranged to implement interference alignment, and selecting a matrix V' having a highest similarity to the precoding matrix V from the current codebook to serve as the finally quantized precoding matrix V'.

16. The apparatus according to claim 15, wherein the second set storage circuit comprises:
a second design circuit, arranged to design, according to a transmitting antenna number configuration of a multi-cell multi-antenna system and a number of data streams to be sent by a user in the system, a codebook set of codebooks of different sizes; and
a second storage circuit, arranged to store the codebook set.

17. The apparatus according to claim 15, wherein the second codebook selection circuit comprises:
a codebook selection circuit, arranged to select, according to a feedback capacity limitation of the current system and a quantization error range allowed by the system, a codebook from the codebook set to serve as the current codebook.

18. The apparatus according to claim 15, wherein the precoding matrix index receiving circuit is arranged to receive feedback information or indication information of the index number of the quantized precoding matrix V' sent by the receiver.

* * * * *